United States Patent
Li et al.

(10) Patent No.: US 8,608,257 B2
(45) Date of Patent: Dec. 17, 2013

(54) PROJECTOR SUSPENSION DEVICE

(75) Inventors: Chang-Ching Li, Hsinchu (TW); Fan-Chieh Chang, Hsinchu (TW); Hao-Chang Tsao, Hsinchu (TW)

(73) Assignee: Coretronic Corporation, Hsin-chu (TW)

( * ) Notice: Subject to any disclaimer, the term of this patent is extended or adjusted under 35 U.S.C. 154(b) by 139 days.

(21) Appl. No.: 13/341,718

(22) Filed: Dec. 30, 2011

(65) Prior Publication Data

US 2012/0256525 A1  Oct. 11, 2012

(30) Foreign Application Priority Data

Apr. 8, 2011 (CN) .......................... 2011 1 0090291

(51) Int. Cl.
*A47B 81/00* (2006.01)

(52) U.S. Cl.
USPC .......................... 312/10.1; 312/245; 248/317

(58) Field of Classification Search
USPC ......... 312/10.1, 245–246, 205; 248/317, 323, 248/343, 674, 225.11, 346.05, 188.7
See application file for complete search history.

(56) References Cited

U.S. PATENT DOCUMENTS

| | | | | |
|---|---|---|---|---|
| 4,433,870 A * | 2/1984 | Bairen et al. | | 297/16.1 |
| 5,492,301 A * | 2/1996 | Hauser | | 248/516 |
| 5,758,933 A * | 6/1998 | Clendening | | 312/205 |
| 6,030,061 A * | 2/2000 | Lee | | 312/205 |
| 6,402,111 B1 * | 6/2002 | Stewart et al. | | 248/317 |
| 2005/0161575 A1 * | 7/2005 | Friederich et al. | | 248/519 |
| 2005/0236546 A1 * | 10/2005 | O'Neill | | 248/317 |
| 2006/0186301 A1 * | 8/2006 | Dozier et al. | | 248/371 |
| 2007/0034765 A1 * | 2/2007 | Lo | | 248/343 |
| 2007/0145223 A1 * | 6/2007 | Huang | | 248/333 |
| 2008/0135713 A1 * | 6/2008 | Santoro | | 248/346.03 |
| 2008/0169403 A1 * | 7/2008 | Rooney | | 248/343 |
| 2009/0236479 A1 * | 9/2009 | Rose | | 248/188.7 |

FOREIGN PATENT DOCUMENTS

TW  M290962  5/2006
TW  200938933  9/2009

* cited by examiner

*Primary Examiner* — Hanh V Tran
(74) *Attorney, Agent, or Firm* — Muncy, Geissler, Olds & Lowe, PLLC

(57) ABSTRACT

A projector suspension device includes a casing and a suspension mechanism. The casing defines a space for accommodating an optical projection engine, and the casing has a trough extending into an inside of the casing. The suspension mechanism includes a fixed rod and a movable rod, and the fixed rod is disposed inside and fixed to the casing. One end of the movable rod is connected to the fixed rod, and another end of the movable rod is fixed to a stationary object. The movable rod is slidably coupled to the fixed rod and slides relative to the fixed rod so as to be stored inside the trough or to stick out from the trough.

7 Claims, 8 Drawing Sheets

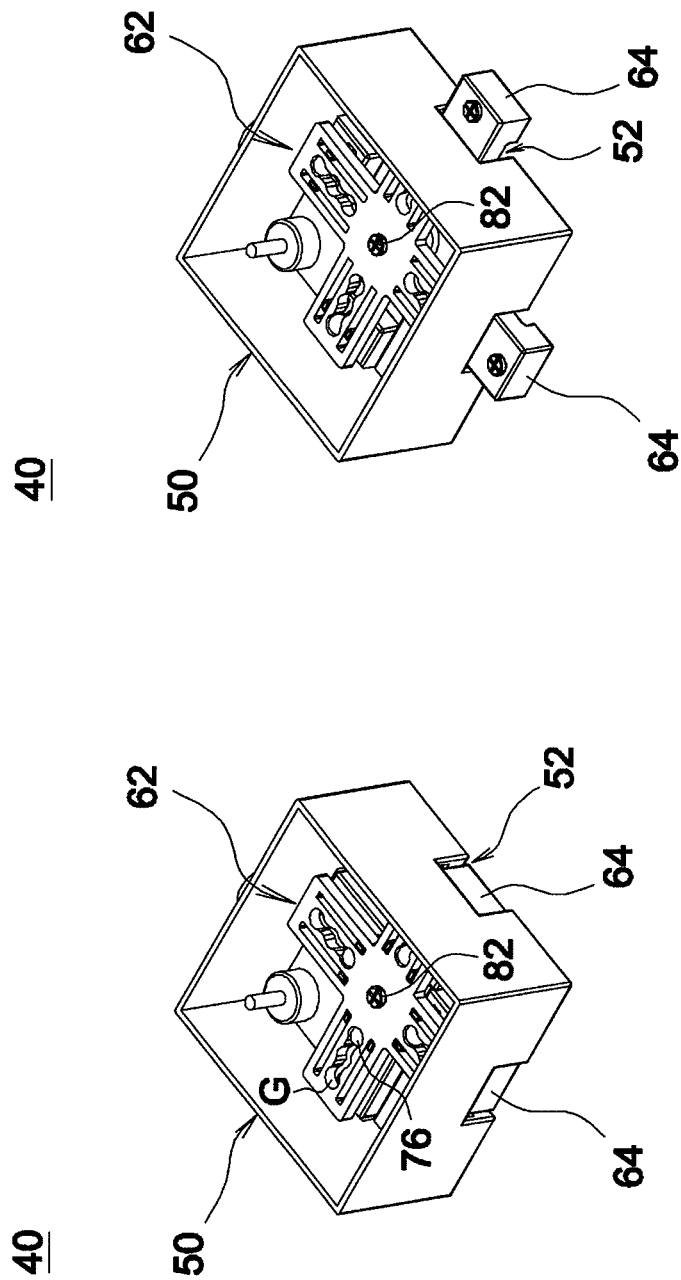

PROJECTOR SUSPENSION DEVICE

BACKGROUND OF THE INVENTION a. Field of the Invention

The invention relates to a projector suspension device.

b. Description of the Related Art

Referring to FIG. 1, Taiwan patent no. M290962 discloses a suspension support for a projector, where the suspension support 102 is used to adjust the height of a suspended projector 100. An extendable rod 114 is sleeved inside a suspension rod 112, and multiple screw holes 116 are formed on the extendable rod 114. A bolt 118 passes through the suspension rod 112 and is screwed into a screw hole 116 to fix the extendable rod 114. Therefore, the length of the entire suspension support 102 is adjusted by screwing the bolt 118 into the screw holes 116 located at various positions. The extendable rod 114 is connected with a bracket 120 and mounted on a surface of the projector casing 122 together with the bracket 120.

According to the above design, the suspension support 102 fails to be stored inside the projector 100 to cause inconvenient use and occupy a considerable space. Taiwan patent publication no. 200938933 discloses a projection screen mount having a main body and an extendable support. The main body has a casing and a bracket, and an opening. The extendable support is disposed in the opening and allowed to be lengthened or shortened. One end of the extendable support is fixed on the main body, and another end of the extendable support is inserted into and sticks out from the casing through the opening.

BRIEF SUMMARY OF THE INVENTION

The invention provides a projector suspension device. The projector suspension device has at least one of the advantages of high integrity, convenient storage, high portability, and reduced occupied space, weight and fabrication costs.

Other objects and advantages of the invention can be better understood from the technical characteristics disclosed by the invention.

In order to achieve one of the above purposes, all the purposes, or other purposes, one embodiment of the invention provides a projector suspension device including a casing and a suspension mechanism. The casing defines a space for accommodating an optical projection engine, and the casing has a trough extending into an inside of the casing. The suspension mechanism includes a fixed rod and a movable rod, and the fixed rod is disposed inside and fixed to the casing. One end of the movable rod is connected to the fixed rod, another end of the movable rod is fixed to a stationary object, and the movable rod is slidably coupled to the fixed rod and slides relative to the fixed rod to be stored inside the trough or to stick out from the trough.

In one embodiment, the fixed rod has a first end and a second end opposite the first end, the first end of the fixed rod has a flange, and an opening formed on the second end is smaller than an opening formed on the first end.

In one embodiment, the fixed rod is disposed inside the trough of the casing.

In one embodiment, the projector suspension device further includes a fixed plate. The fixed plate is screwed to a side wall of the trough to fix the fixed rod to the side wall, and the flange is disposed between the fixed plate and the side wall.

In one embodiment, the movable rod has a movable part and a bracket, the movable part is connected between the bracket and the fixed rod, and a thread structure is formed on one end of the bracket, and the movable part is connected to the end of the bracket. In one embodiment, the projector suspension device further includes a fastening screw, and the fastening screw penetrates through and is screwed to the movable part and the bracket.

According to another embodiment of the invention, a projector suspension device includes a casing and a suspension mechanism. The casing defines a space for accommodating an optical projection engine, and the casing has a plurality of openings. The suspension mechanism includes a bracket and a plurality of movable bases, and the bracket is disposed inside and fixed to the casing. One end of each of the movable bases is connected with the bracket and another end of each of the movable bases is fixed to a stationary object. The movable bases are slidably coupled to the bracket and slide relative to the bracket so as to be stored inside the casing or to stick out from the openings.

In one embodiment, the bracket includes a plurality of fixed arms corresponding to the movable bases respectively, each of the fixed arms has a slide rail, and the slide rail has at least one locating groove. In one embodiment, each of the movable bases has an engaging structure, and each engaging structure is inserted into a corresponding locating groove to position each movable base on a corresponding fixed arm. In one embodiment, each engaging structure may be in the shape of a sphere and the at least one locating groove may have a circular cross-section.

In one embodiment, each of the fixed arms has at least one positioning slot, each of the movable bases has at least one positioning pillar, and the at least one positioning pillar is confined to the at least one positioning slot.

In one embodiment, each of the movable bases has at least one fastening hole, and each of the movable bases is fixed to the stationary object through the at least one fastening hole.

In one embodiment, the stationary object may be a ceiling.

In conclusion, the embodiment or the embodiments of the invention may have at least one of the following advantages.

According to the above embodiments, a fixed element of a suspension mechanism is fixed to a casing, one end of a movable element of the suspension mechanism is slidably coupled to the fixed element to allow the movable element to slide relative to the fixed element, and another end of the movable element is connected with a stationary object. Therefore, the suspension mechanism may be integrated into a casing, and the suspension mechanism may be allowed to be stored inside the casing or to stick out from the casing. Accordingly, an operation for storing the suspension mechanism inside the casing becomes quite convenient, and the suspension mechanism is more portable and has reduced occupied space, weight and fabrication costs.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIGS. 8A and 8B show schematic diagrams illustrating an operation of the projector suspension device show in FIG. 6.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
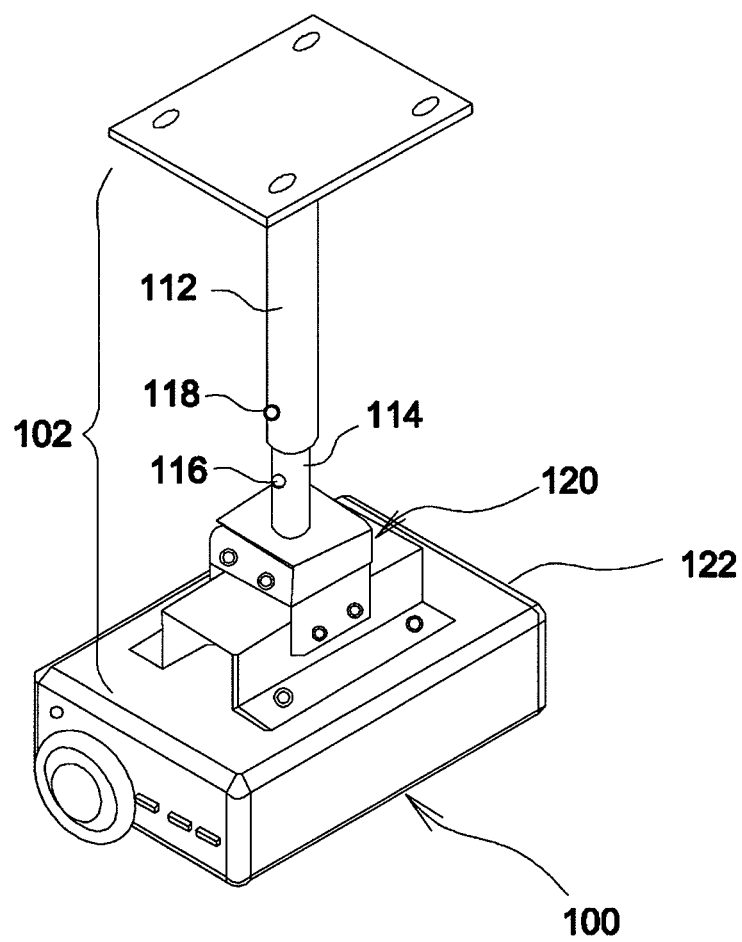
FIG. 1 shows a schematic diagram of a conventional suspension support for a projector.
Figure 3:
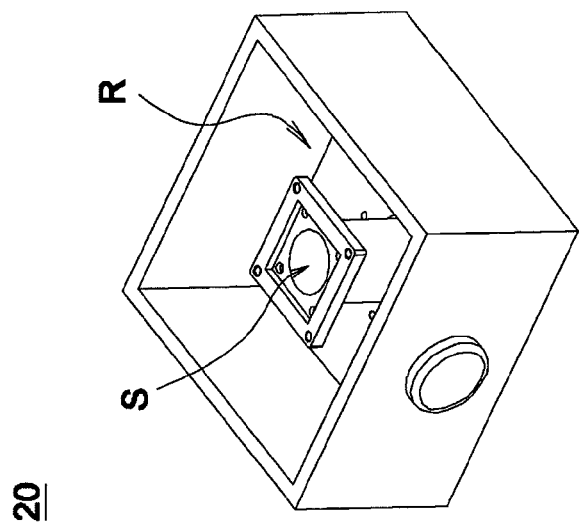
FIG. 3 shows a projector casing according to an embodiment of the invention.
Figure 2:
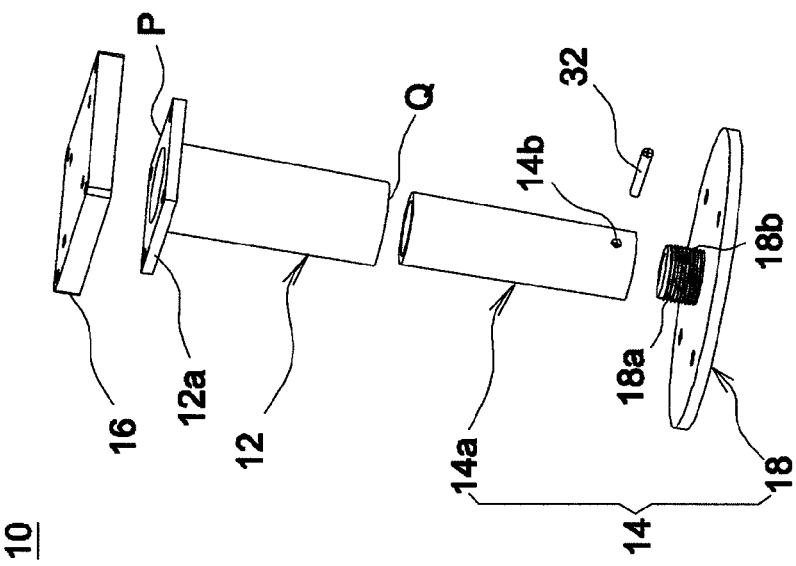
FIG. 2 shows an explosion diagram of a suspension mechanism according to an embodiment of the invention.

Please refer to both FIG. 2 and FIG. 3, a suspension mechanism 10 in the embodiment includes a fixed rod 12 and at least one movable rod 14. The projector casing 20 defines a space R for accommodating an optical projection engine (not shown), and the projector casing 20 has a trough S extending to the inside of the projector casing 20. The fixed rod 12 is disposed inside the trough S of the projector casing 20, and the movable rod 14 is slidably coupled to the fixed rod 12. In the embodiment, the fixed rod 12 has a first end P and a second end Q opposite the first end P, and the first end P has a flange 12a. The fixed rod 12 and the movable rod 14 are complementary in the shapes of cones with tapered diameters. Since an opening formed on the second end Q of the fixed rod 12 is smaller than an opening formed on the first end P and an opening of the movable rod 14, the movable rod 14 would not drop off while the movable rod 14 is inserted into the fixed rod 12. The movable rod 14 may slide relative to the fixed rod 12 to lengthen or shorten the suspension mechanism 10. Though the suspension mechanism 10 is exemplified as having one movable rod 14, the number of the movable rod 14 is not restricted and may be determined by actual demands (such as a maximum length of the suspension mechanism).

Moreover, the movable rod 14 in the embodiment has a movable part 14a and a bracket 18, and the movable part 14a is connected between the bracket 18 and the fixed rod 12. One end of the bracket 18 is connected with the movable part 14a, and another end of the bracket 18 is fixed on a surface of a stationary object. For example, the bracket 18 may be mounted on a ceiling (not shown). Further, a thread structure 18a may be formed on one end of the bracket 18 to be connected to the movable part 14a, so that the bracket 18 is capable of being screwed to the movable part 14a. Besides, through holes 18b and 14b are respectively formed on the bracket 18 and the movable part 14a, and a fastening screw 32 is inserted into the through hole 14b on the movable part 14a and the through hole 18b on the bracket 18; that is, the fastening screw 32 penetrates through and is screwed to the movable part 14a and the bracket 18. Therefore, the connection strength would be enhanced and the loose attachment issue would be avoided.

Figure 4B:
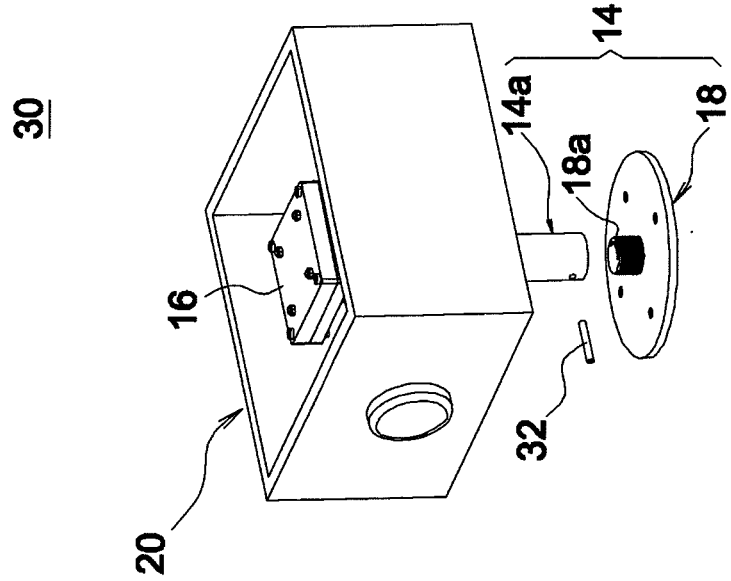
FIGS. 4A and 4B show schematic diagrams of a suspension mechanism mounted on a projector casing according to an embodiment of the invention.
Figure 4A:
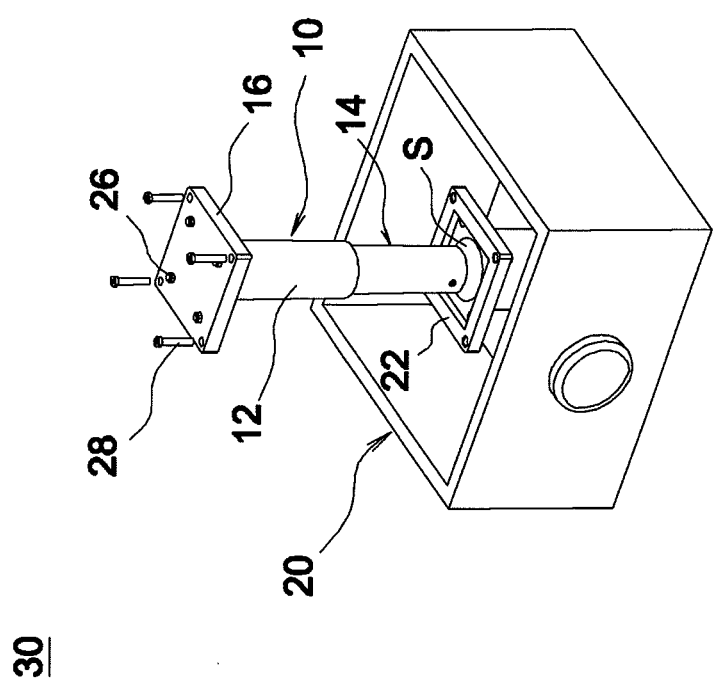

Further, the suspension mechanism 10 in the embodiment further includes a fixed plate 16. Specifically, as shown in FIG. 4A, during assembly, the fixed rod 12 is disposed inside the trough S of the projector casing 20, the movable rod 14 is inserted into the fixed rod 12, and the fixed plate 16 is screwed to the flange 12a of the fixed rod 12 (shown in FIG. 2) by at least one screw 26. Then, the fixed plate 16 is screwed to a side wall 22 of the trough S by at least one screw 28. Therefore, the fixed rod 12 is fixed on the projector casing 20 since the fixed rod 12 is fixed on the side wall 22 of the trough S. The suspension mechanism 10 is mounted on the projector casing 20 to form a projector suspension device 30. Besides, as shown in FIG. 4B, the bracket 18 is screwed to one end of the movable part 14a by the thread structure 18a and the fastening screw 32 penetrates through and is screwed to the movable part 14a and the bracket 18 in order to enhance connection strength and avoid loose attachment.

Figure 5B:
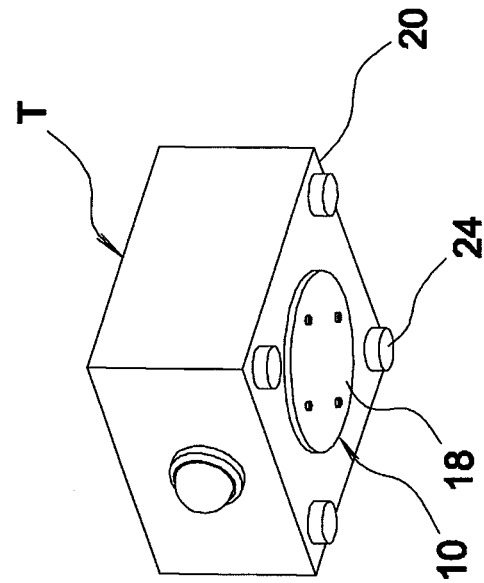
FIGS. 5A and 5B show schematic diagrams of a projector mounted on a stationary object by a bracket according to an embodiment of the invention.
Figure 5A:
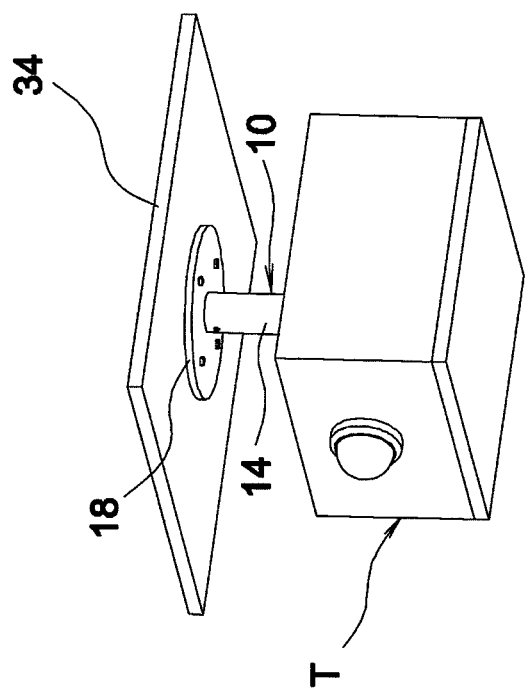

According to the above embodiment, the suspension mechanism 10 is integrated into a projector T, and the projector T is mounted on a stationary object such as a ceiling 34 by the bracket 18 of the movable rod 14. Under the circumstance, the movable rod 14 slides relative to the fixed rod 12 through the force of gravity to outwardly extend to a suitable position to project an image. Further, as shown in FIG. 5B, after a user finishes using the projector T, the movable rod 14 slides relative to the fixed rod 12 so as to store the entire suspension mechanism 10 inside the projector T, and the bracket 18 may be screwed to and attached a bottom surface of the projector T.

The projector casing 20 in the embodiment may further include foot pads 24 disposed in the corners of the projector casing 20. However, the arrangement and the shape of the foot pads 24 are not restricted. In an alternate embodiment, at least one accommodating trough (not shown) extending inwardly inside the projector casing 20 may be formed to accommodate foot pads 24.

Figure 6:
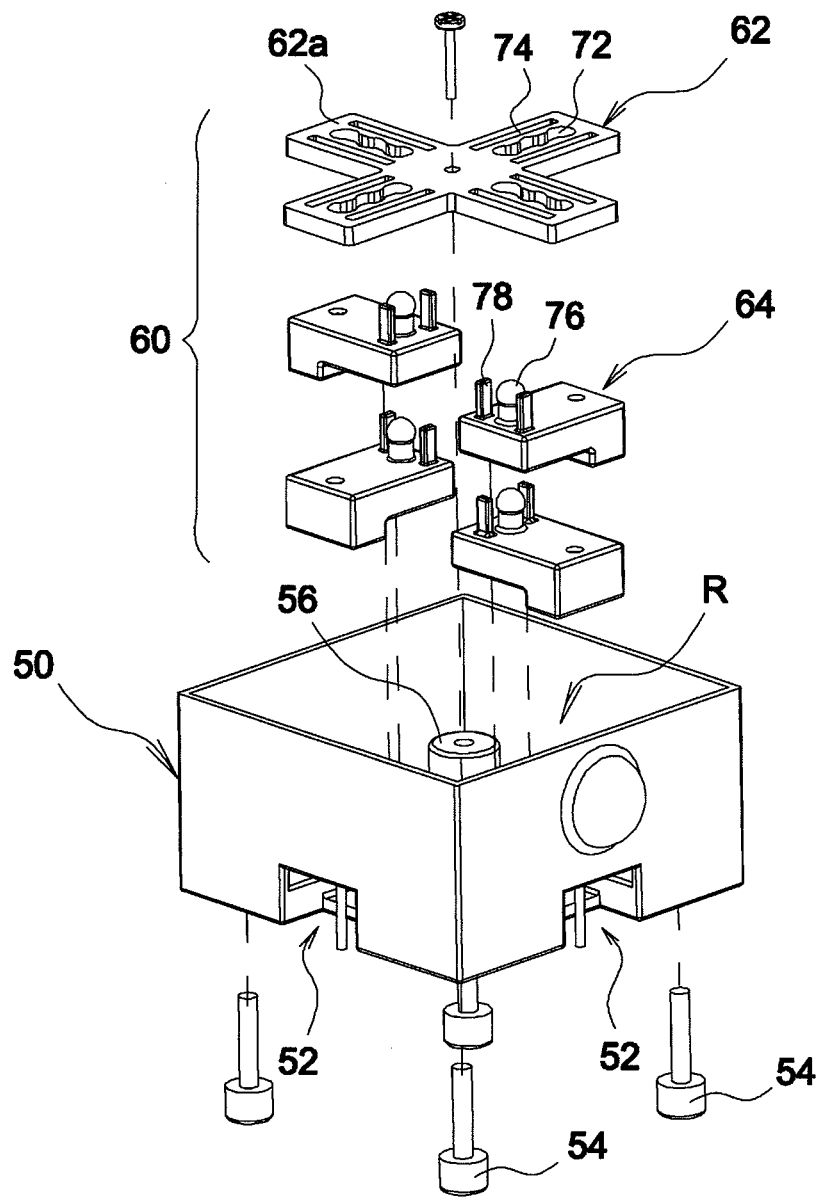
FIG. 6 shows an explosion diagram of a projector suspension device according to another embodiment of the invention.

Referring to FIG. 6, a projector suspension device 40 includes a projector casing 50 and a suspension mechanism 60 mounted on the projector casing 50. The projector casing 50 may define a space R for accommodating an optical projection engine (not shown), and the projector casing 50 has a plurality of openings 52. The suspension mechanism 60 has a bracket 62 and a plurality of movable base 64.

More specifically, the bracket 62 in the embodiment may include a plurality of fixed arms 62a corresponding to the movable bases 64. For example, as shown in FIG. 6, the projector casing 50 has four side surfaces, and each side surface is provided with an opening 52. The suspension mechanism 60 is exemplified as having four movable bases 64, the bracket 62 is exemplified as having four fixed arms 62a, and four fixed arms 62a are mutually spaced apart by 90 degrees relative to a center of the bracket 62. Therefore, the movable bases 64 may stick out from the four openings 52. Certainly, the number of the fixed arms 62a and the movable base 64 is not restricted. For example, the suspension mechanism 60 may have three movable bases 64, three fixed arms 62a are mutually spaced apart by 120 degrees relative to a center of the bracket 62, and the three movable bases 64 respectively stick out from three openings.

Figure 7:
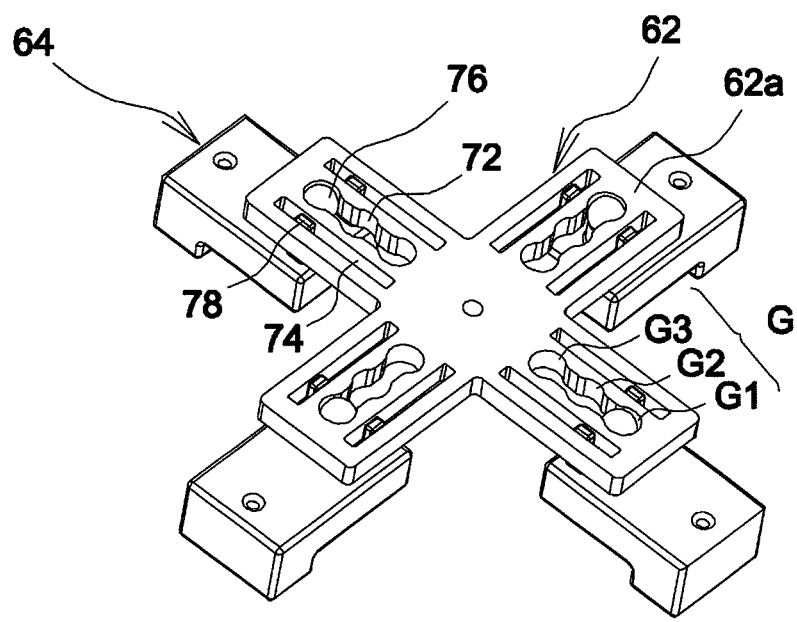
FIG. 7 shows a schematic diagram of a bracket in combination with a movable base according to an embodiment of the invention.

According to the above embodiment, each of the fixed arms 62a has a slide rail 72 and at least one positioning slot 74 (FIG. 6 exemplifies two positioning slots), and each of the movable bases 64 has an engaging structure 76 and at least one positioning pillar 78 (FIG. 6 exemplifies two positioning pillars). As shown in FIG. 7, each slide rail 72 of the fixed arms 62a may have a plurality of locating grooves G (such as locating grooves G1,G2, and G3), and the engaging structure 76 of the movable base 64 may slide along the slide rail 72 of the fixed arms 62a. The engaging structure 76 may be inserted into any one of the locating grooves G to be fixed on different positions of the bracket 62. In other words, the movable base 64 may be slidably coupled to the bracket 62 and capable of being fixed on different positions of the bracket 62. Further, the positioning pillar 78 of the movable base 64 may be confined to the positioning slot 74 to prevent the movable base 64 from swinging upon sliding on the bracket 62 to enhance the stability. In one embodiment, the engaging structure 76 and the locating groove G are complementary in shape. For example, in case the engaging structure 76 is in the shape of a sphere, the locating groove G may have a circular cross-section.

Figure 10:
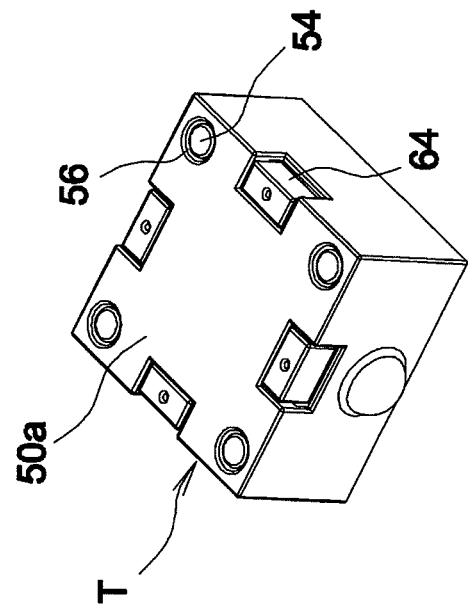
FIG. 10 shows a schematic diagram of foot pad troughs formed on a projector casing according to an embodiment of the invention.
Figure 9:
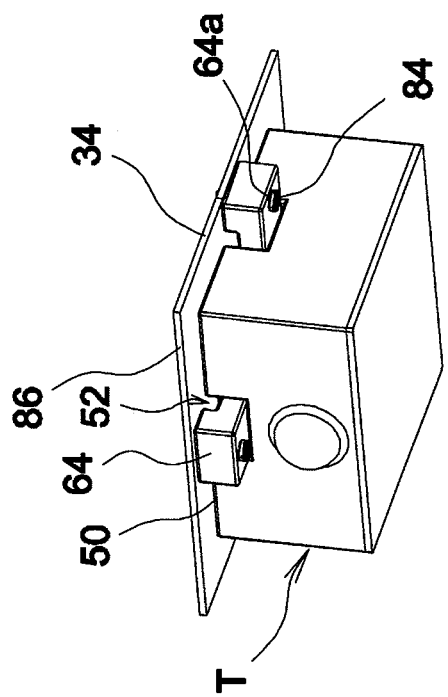
FIG. 9 shows a schematic diagram of movable bases mounted on a stationary object according to an embodiment of the invention.

Please refer to both FIG. 8A and FIG. 8B, in the embodiment, after the bracket 62 is fixed on an inner wall of the projector casing 50 by a screw 82, the movable bases 64 may slide relative to the bracket 62 to be stored inside the projector casing 50 (FIG. 8A) or to stick out from the openings 52 of the projector casing 50 (FIG. 8B), simply by inserting the engaging structure 76 of the movable base 64 into different locating grooves G. Further, as shown in FIG. 9, after the movable bases 64 stick out from the openings 52 of the projector casing 50, each screw 84 is inserted into the corresponding fastening hole 64a formed on each movable base 64 to screw each movable base 64 to a stationary object. For example, after the movable bases 64 stick out from respective openings 52, each of the movable bases 64 may be screwed to a ceiling 34, so the projector T is capable of hanging from the ceiling 34 by the projector suspension device 40. Also, after a user finishes using the projector T, the movable bases 64 are entirely stored inside the projector T, as shown in FIG. 10. In the embodiment, the movable bases 64 may stick out from and may be stored inside the projector casing 50 manually or by electric power.

Referring to FIG. 10, in the above embodiment, the projector casing 50 has multiple troughs 56 for accommodating foot pads 54. Each trough 56 extends inwardly inside the projector casing 50 and is disposed in a corner of the projector casing 50. The number of the troughs 56 may be identical to the number of the foot pads 54. As shown in FIG. 10, in case the projector casing 50 is to be mounted on a ceiling, each foot pad 54 may withdraw to a corresponding trough 56 in advance. Therefore, the ceiling may be evenly covered with the bottom surface 50a of the projector casing 50 to make the movable bases 64 be screwed to the ceiling easily.

In conclusion, the embodiment or the embodiments of the invention may have at least one of the following advantages.

According to the above embodiments, a fixed element of a suspension mechanism is fixed on a projector casing, one end of a movable element of the suspension mechanism is slidably coupled to the fixed element to allow the movable element to slide relative to the fixed element, and another end of the movable element is connected with a stationary object. Therefore, the suspension mechanism is integrated into a projector casing, and the suspension mechanism is allowed to be entirely stored inside the projector casing or to stick out from the projector casing. Accordingly, the embodiments of the invention have advantages of storing conveniently, portable property, and reduced occupied space, weight, and fabrication costs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projector suspension device, comprising:
   a casing, defining a space for accommodating an optical projection engine, wherein the casing has a plurality of openings; and
   a suspension mechanism, comprising:
      a bracket, disposed inside and fixed to the casing; and
      a plurality of movable bases, one end of each of the movable bases being connected with the bracket and another end of each of the movable bases being fixed to a stationary object, wherein the movable bases are slidably coupled to the bracket and slide relative to the bracket so as to be stored inside the casing or to stick out from the openings.

2. The projector suspension device as claimed in claim 1, wherein the bracket comprises a plurality of fixed arms corresponding to the movable bases respectively, each of the fixed arms has a slide rail, and the slide rail has at least one locating groove.

3. The projector suspension device as claimed in claim 2, wherein each of the movable bases has an engaging structure, and each engaging structure is inserted into a corresponding locating groove to position each movable base on a corresponding fixed arm.

4. The projector suspension device as claimed in claim 3, wherein each engaging structure is in the shape of a sphere and the at least one locating groove has a circular cross-section.

5. The projector suspension device as claimed in claim 2, wherein each of the fixed arms has at least one positioning slot, each of the movable bases has at least one positioning pillar, and the at least one positioning pillar is confined to the at least one positioning slot.

6. The projector suspension device as claimed in claim 1, wherein each of the movable bases has at least one fastening hole, and each of the movable bases is fixed to the stationary object through the at least one fastening hole.

7. The projector suspension device as claimed in claim 1, wherein the stationary object is a ceiling.

* * * * *